United States Patent
Li et al.

(10) Patent No.: US 12,015,445 B2
(45) Date of Patent: Jun. 18, 2024

(54) OPTICAL TRANSMITTER CHIP BASED ON OTN TRANSMISSION TECHNOLOGY

(71) Applicant: XIAMEN EOCHIP SEMICONDUCTOR CO., LTD, Xiamen (CN)

(72) Inventors: Jinghu Li, Xiamen (CN); Fujie Chen, Xiamen (CN); Hanghui Tu, Xiamen (CN)

( * ) Notice: Subject to any disclaimer, the term of this patent is extended or adjusted under 35 U.S.C. 154(b) by 0 days.

(21) Appl. No.: 18/240,601

(22) Filed: Aug. 31, 2023

(65) Prior Publication Data
US 2024/0072902 A1 Feb. 29, 2024

(30) Foreign Application Priority Data
Aug. 31, 2022 (CN) .......................... 202211055842.8

(51) Int. Cl.
*H04B 10/50* (2013.01)
(52) U.S. Cl.
CPC .................................. *H04B 10/503* (2013.01)
(58) Field of Classification Search
CPC .............. H04B 10/503; H04B 10/5057; H04B 10/50572
USPC .......................................................... 398/79
See application file for complete search history.

(56) References Cited

U.S. PATENT DOCUMENTS

| | | | | |
|---|---|---|---|---|
| 9,310,424 B2 * | 4/2016 | Allen-Ware | ....... | G01R 31/2851 |
| 2004/0151073 A1 * | 8/2004 | Preisach | ................ | H04B 10/40 |
| | | | | 368/110 |
| 2005/0031352 A1 * | 2/2005 | Light | ..................... | H04B 10/50 |
| | | | | 398/135 |
| 2005/0111845 A1 * | 5/2005 | Nelson | ................. | H04B 10/672 |
| | | | | 398/138 |
| 2005/0169585 A1 * | 8/2005 | Aronson | ................ | H04B 10/40 |
| | | | | 385/89 |
| 2006/0093379 A1 * | 5/2006 | Aronson | ............ | H04B 10/0775 |
| | | | | 398/208 |
| 2008/0292311 A1 * | 11/2008 | Daghighian | ........... | H04B 10/40 |
| | | | | 398/9 |

(Continued)

FOREIGN PATENT DOCUMENTS

| | | |
|---|---|---|
| CN | 102325280 A | 1/2012 |
| CN | 102917283 A | 2/2013 |

(Continued)

*Primary Examiner* — Dalzid E Singh
(74) *Attorney, Agent, or Firm* — Novoclaims Patent Services LLC; Mei Lin Wong

(57) ABSTRACT

An optical transmitter chip based on OTN transmission technology, which solves the high bit error rate in existing OTN technology for data transmission below 100 m in the data center, includes a transmitter TX, a digital control unit DIGITAL, and a power module POWER. The transmitter TX first uses the optical modulation amplitude signal loss module to complete a judgment of an optical modulation amplitude for an attenuated electrical signal transmitted through metal traces on a PCB board. Only if the signal is greater than the preset threshold, an enable signal is output to control a linear equalizer and a laser driver to start, and open a signal transmission path for the chip-driven laser to emit an optical signal. The linear equalizer and the bypass ByPass process signal optimization in two-stage, then the signal is sent to the laser driver to drive the laser to emit an optical signal.

5 Claims, 2 Drawing Sheets

(56) References Cited

U.S. PATENT DOCUMENTS

| | | |
|---|---|---|
| 2012/0045202 A1 | 2/2012 | Jiang et al. |
| 2015/0125158 A1* | 5/2015 | El-Ahmadi ........... H04L 1/0041 |
| | | 398/135 |
| 2016/0277109 A1 | 9/2016 | Chaffee et al. |
| 2018/0287709 A1 | 10/2018 | Lu et al. |

FOREIGN PATENT DOCUMENTS

| | | |
|---|---|---|
| CN | 113141549 A | 7/2021 |
| CN | 113495331 A | 10/2021 |
| CN | 114614900 A | 6/2022 |

* cited by examiner

OPTICAL TRANSMITTER CHIP BASED ON OTN TRANSMISSION TECHNOLOGY

CROSS REFERENCE OF RELATED APPLICATION

This is a non-provisional application which claimed priority of Chinese application number 202211055842.8, filing date 31 Aug. 2022. The contents of these specifications, including any intervening amendments thereto, are incorporated herein by reference.

FIELD OF INVENTION

The present invention relates to the field of integrated circuit and optical communication.

DESCRIPTION OF RELATED ARTS

In order to prevent the downward trend of the economy and stimulate the vitality of the market economy, the central government proposed to complete the trillion-level infrastructure "rescue" plan in the next few years. Large-scale infrastructure includes not only traditional infrastructure such as roads, airports, bridges, water conservancy, and etc., but also puts forward the concept of "moderately advanced infrastructure construction", that is, new infrastructure, which includes the new engine needed on the road of China's economic development in the future: 5G network, UHV transmission, industrial Internet, artificial intelligence, big data center, etc. Therefore, the new infrastructure must be supported by high-speed data transmission in order to complete the historical task of economic transformation.

The optical chips in the big data center are assigned different application scenarios according to the transmission distance: (1) <20 m, interconnected in-cabinet server and TOR switches; (2) <500 m, interconnected leaf-to-spine switches in the same equipment room of the data center; (3) <10 km, interconnected switches or routers of different data center buildings; (4) >10 km, interconnected multiple data centers. The short-distance data transmission below 100 m is mainly based on 850 nm wavelength multimode fiber, which realizes channel multiplexing and improves the transmission rate. In this application scenario, the transmitter uses a vertical cavity surface emitting laser VCSEL (Vertical Cavity Surface Emitting Laser); it has low production cost and is suitable for high-speed and short-distance transmission.

Wherein, MSTP/SDH technology focuses on the electrical layer processing of services, and has good scheduling, management and protection capabilities. Among them, MSTP (Multi-Service Transport Platform) is a multi-service transmission platform, SDH (Synchronous Digital Hierarchy) is a synchronous digital system, and The OAM (Operation Administration and Maintenance) function of MSTP/SDH technology is complete. However, MSTP/SDH technology uses VC4 (Virtual Container virtual container) as the main cross-connect particle and adopts single-channel lines. The cross-connect particle and capacity growth are gradually insufficient for large-particle, high-speed, and packet-based services. Another transmission technology, WDM (Wavelength Division Multiplexing, wavelength division multiplexing) technology, focuses on the optical layer processing of services. The transmission characteristics of the multi-wavelength channel determine that it has the natural advantage of providing large-capacity transmission. However, the current WDM network mainly adopts the point-to-point application mode and lacks flexible service scheduling means.

In order to overcome the shortcomings of MSTP/SDH technology and WDM technology, the OTN technology (Optical transport network, Optical Transport Network), which is in one of the development directions of the new generation of transport network, is developed. It applies the operable and manageable capabilities of SDH to the WDM system, and has the advantages of SDH and WDM at the same time, and meets the transmission requirements of multi-service, large capacity, high reliability and high quality to a greater extent.

When the OTN technology to short-distance data transmission below 100 m in the data center is used in application, the TX (Transmit) transmitter chip in the application often has signal attenuation caused by the transmission of data information through the metal wiring on the PCB board, resulting in a high bit error rate.

SUMMARY OF THE PRESENT INVENTION

An object of the present invention is to provide an optical transmitter chip based on OTN transmission technology to solve the problem of high bit error rate in the existing OTN technology-based transmitter chips used for short-distance data transmission below 100 m in the data center.

According to the present invention, an optical transmitter chip based on OTN transmission technology comprises: a transmitter TX, a digital control unit DIGIITAL, and a power module POWER;

the digital control unit DIGIITAL communicates with a host and provides a control signal to the transmitter TX;

the power module POWER is arranged to provide working power supply to the chip;

the transmitter TX first uses the optical modulation amplitude signal loss module OMALOS to complete a judgment of an optical modulation amplitude for an attenuated electrical signal transmitted through metal traces on a PCB board, when the signal is greater than the preset threshold, the module outputs an enable signal to control a linear equalizer CTLE and a laser driver 28G VCSELDRIVER to start, and the chip to drive a VCSEL laser to emit an optical signal to open a signal transmission path; otherwise, the entire signal transmission path is closed;

second, when the signal transmission path is open, the linear equalizer CTLE is arranged to complete a first stage optimization for high-frequency compensation of the attenuated electrical signal transmitted through the metal traces on the PCB board; and then, a second stage optimization of the signal is processed, specifically:

in response to the judgment of the first stage optimization, and according to the judgment decision, select one of a multi-rate clock data recovery module CDR and a signal bypass ByPass as a selected signal path to start; when the multi-rate clock data recovery module CDR is started, a signal quality of the signal after the first stage optimization is further improved to complete the second stage optimization;

the signal after a two-stage optimization is sent to the laser driver 28G VCSELDRIVER to drive the VCSEL laser to emit an optical signal.

Preferably, the transmitter TX comprises the linear equalizer CTLE, the optical modulation amplitude signal loss module OMALOS, the multi-rate clock data recovery module CDR, the signal bypass ByPass, a fiber channel mode rate decision FC_mode_Rate_decision, a data selector MUX, a monitor clock module MONITOR CLOCK, the laser driver 28G VCSELDRIVER and a bias current module IBIAS;

chip pins INP and INN are simultaneously connected to two input terminals of the continuous time linear equalizer CTLE and two input terminals of the optical modulation amplitude signal loss module OMALOS;

a control signal output terminal of the optical modulation amplitude signal loss module OMALOS is connected to a control terminal of the continuous time linear equalizer CTLE and a control terminal of the laser driver 28G VCSELDRIVER respectively;

an output terminal of the continuous time linear equalizer CTLE is connected to an input terminal of the multi-rate clock data recovery module CDR, an input terminal of the signal bypass ByPass and an input terminal of the fiber channel mode rate decision FC_mode_Rate_decision respectively;

an output control signal of the fiber channel mode rate decision FC_mode_Rate_decision selects to output to one of a control port of the multi-rate clock data recovery module CDR and a control port of the signal bypass ByPass;

a data signal output terminal of the multi-rate clock data recovery module CDR is connected to an input terminal of the data selector MUX;

a data signal output terminal of the signal bypass ByPass is connected to another input terminal of the data selector MUX;

an output terminal of the data selector MUX is connected to an input terminal of the laser driver 28G VCSELDRIVER;

a clock output terminal of the multi-rate clock data recovery module CDR is connected to an input terminal of the monitoring clock module MONITOR CLOCK;

a positive and negative output terminals of the monitoring clock module MONITOR CLOCK are connected to chip pins MCLKP and MCLKN respectively;

two output pins of the laser driver 28G VCSELDRIVER are connected to chip pins OUTP and OUTN respectively;

an output current signal of the bias current module IBIAS is output through the chip pin IBIAS.

Preferably, the transmitter TX further comprises an eye diagram cross point adjustment module CPA, wherein an output terminal of the eye diagram cross point adjustment module CPA is connected to a control terminal of the laser driver 28G VCSELDRIVER, and the eye diagram cross point adjustment module CPA is arranged to balance a cross point in the signal to a center of the eye diagram and then provide an output.

Preferably, a judgment on the first stage optimization signal is completed by the fiber channel mode rate decision module FC_mode_Rate_decision.

Preferably, the specific method of selecting one of the multi-rate clock data recovery module CDR and the signal bypass ByPass as the selected signal path to start according to the judgment decision comprises:

a first type: in FC mode, the fiber channel mode rate decision module FC_mode_Rate_decision is activated, if a signal detected by the fiber channel mode rate decision module FC_mode_Rate_decision is 8G FC, the fiber channel mode rate decision module FC_mode_Rate_decision controls to activate the signal bypass ByPass as the selected signal path; if a signal detected by the fiber channel mode rate decision module FC_mode_Rate_decision is 16G/32G FC, the fiber channel mode rate decision module FC_mode_Rate_decision controls to activate the multi-rate clock data recovery module CDR as the selected signal path;

a second type: in non-FC mode, the signal bypass ByPass is the signal path with a signal rate is 1~28.1 Gbps; the multi-rate clock data recovery module CDR supports the signal path with a 19~28.1 Gbps signal rate or the signal path with a 19/2~28.1/2 Gbps signal rate, the signal path and a clock rate selection are configured by a digital register.

Preferably, digital control unit DIGITAL comprises an analog-to-digital converter ADC, a $I^2C$ slave, a control register digital core Register Control Digital Core and TX part control port, the TX part control port comprises the linear equalizer CTLE, the eye diagram cross point adjustment CPA, a loss of signal threshold setting LOS_TH, a clock data recovery loop bandwidth adjustment CDR_LBW, the eye diagram cross point adjustment CPA, the bias current IBIAS, an output swing adjustment OP_SWING and a de-emphasis degree adjustment De_Emphasis;

an input terminal of $I^2C$ slave is connected to a chip pin SCL;

an input and output ports of the $I^2C$ slave are connected to a chip pin SDA;

the analog-to-digital converter ADC receives a temperature signal TEMP, a monitoring current MPD and a bias current IBIAS.

Preferably, the power module POWER comprises a DC power supply VDC, a DC chopper DC/DC, resistors R33 and R34;

the DC power supply VDC provides working power for the bias current module IBIAS and a chip input and output port I/O, at the same time, the DC chopper DC/DC converts the DC power supply VDC into a DC power VCC1.8V and outputs through a pin VOUT, the DC power VCC1.8V provides working power for a laser driver LDD and the digital control unit DIGITAL respectively;

an output terminal VOUT of the DC chopper DC/DC is simultaneously connected to one end of the resistor R33 and a chip pin CAP; the chip pin CAP is grounded through a capacitor C11;

another end of the resistor R33 is simultaneously connected to one end of the resistor R44 and a feedback signal terminal FB of the DC chopper DC/DC;

another end of the resistor R44 is connected to ground;

a switch input port SW of the DC chopper DC/DC is connected to a chip pin SW; the chip pin SW is connected to a positive electrode of the DC power supply VDC through an inductor L11;

a power supply voltage port VCC of the DC chopper DC/DC is connected to a chip pin VCC; the chip pin VCC is connected to the positive electrode of the DC power supply VDC;

an enable port EN of the DC chopper DC/DC is connected to a chip pin EN; the chip pin EN is simultaneously connected to one end of a capacitor C22 and the positive electrode of the DC power supply VDC; another end of the capacitor C22 is grounded, and a negative electrode of the DC power supply VDC is grounded.

The advantageous effect of the present invention: The present invention provides an overall framework structure of an optical transmitter chip based on the OTN transmission technology, and integrates the TX part, the Digital part and the POWER part together to manufacture a chip after solving the problems in the existing technologies.

The low-power laser driver in the TX part can drive the VCSEL laser for short-distance applications to configure a reasonable setting of the bias current and modulation current of the laser, and to prolong the service life of the laser. In FC (Fibre Channel) fiber channel mode, the rate decision module automatically guides the signal to select the CDR or Bypass path, and then cooperate with the digital module to optimize the transmission quality of the eye diagram, which greatly reduces the bit error rate of the output signal. The built-in power management module DC/DC can save the cost of peripheral hardware and space occupation, and is also conducive to the overall power consumption control of the optical receiving chip, which is more suitable for the strict requirements of data centers on power consumption and heat dissipation.

DETAILED DESCRIPTION OF THE PREFERRED EMBODIMENT

The following will clearly and completely describe the technical solutions in the embodiments of the present invention with reference to the accompanying drawings in the embodiments of the present invention. Clearly, the described embodiments are only some, not all, of the embodiments of the present invention. Based on the embodiments of the present invention, all other embodiments obtained by persons of ordinary skill in the art without inventive steps fall within the protection scope of the present invention.

It should be noted that, in the case of no conflict, the embodiments of the present invention and the features in the embodiments can be combined with each other.

The present invention provides an overall framework structure of an optical transmitter chip based on the OTN transmission technology, the TX part, the Digital part and the POWER part solves the existing technological problems and then are integrated together in the same wafer substrate for manufacturing. In the TX part, a high-frequency compensation is processed on the electrical signal attenuated by traces on the PCB board, and the optical modulation amplitude detection is also processed on the electrical signal at the same time. After the signal threshold requirement is met, the continuous-time linear equalizer and the output stage laser driver are controlled to be activated. The CDR and ByPass modules are also inserted between the input and output of the signal. In FC mode, the signal rate is first judged and then decided to determine whether the signal needs to be further optimized by CDR. The 28 Gbps laser driver quickly generates a modulation current of about 16 mA to drive the VCSEL laser in short-reach applications. The digital part Digital communicates with the host computer through two signal lines SCL and SDA to realize the control of the internal parameters of the optical transmitter chip and the optimization of data transmission quality. In order to meet the strict control of chip power consumption by the data center, the built-in DC/DC can reduce the overall power consumption of the optical transmitter chip, reduce the hardware cost of the optical module, and facilitate the miniaturization of the optical module. The above are the keys to the realization of the invention.

The present invention is further described below with the accompanying drawings and specific embodiments, but not serving as limitations of the present invention.

Figure 1:
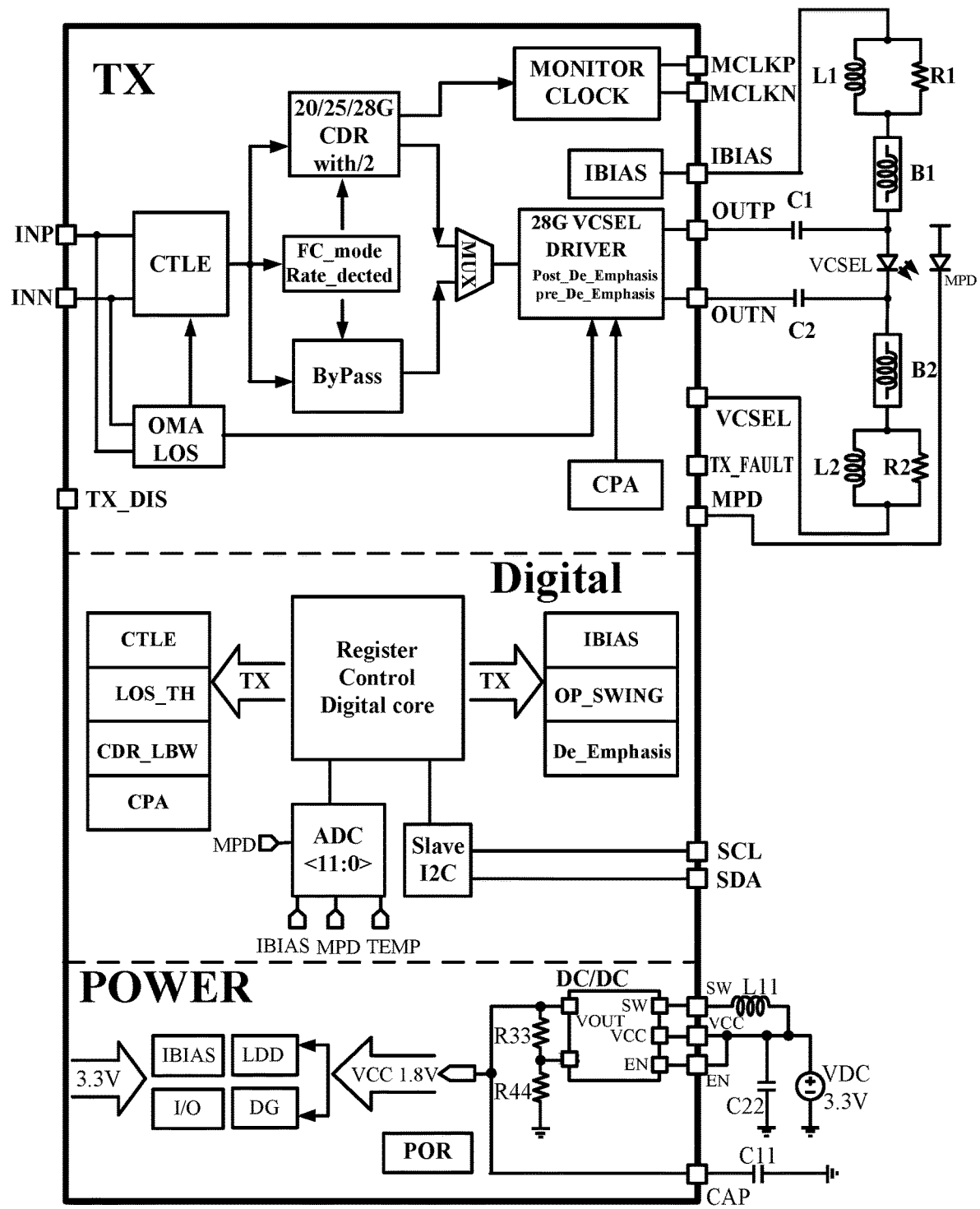
FIG. 1 is a schematic structural diagram of the optical transmitter chip based on OTN transmission technology of the present invention.

Preferred Embodiment 1: This embodiment is described below in conjunction with FIG. 1. According to this embodiment, an optical transmitter chip based on OTN transmission technology comprises: a transmitter TX, a digital control unit DIGITAL, and a power module POWER;

the digital control unit DIGITAL communicates with a host and provides a control signal to the transmitter TX;

the power module POWER is arranged to provide working power supply to the chip;

the transmitter TX comprises the linear equalizer CTLE, the optical modulation amplitude signal loss module OMALOS, the multi-rate clock data recovery module CDR, the signal bypass ByPass, a fiber channel mode rate decision FC_mode_Rate_decision, a data selector MUX, a monitor clock module MONITOR CLOCK, the laser driver 28G VCSELDRIVER and a bias current module IBIAS;

chip pins INP and INN are simultaneously connected to two input terminals of the continuous time linear equalizer CTLE and two input terminals of the optical modulation amplitude signal loss module OMALOS;

a control signal output terminal of the optical modulation amplitude signal loss module OMALOS is connected to a control terminal of the continuous time linear equalizer CTLE and a control terminal of the laser driver 28G VCSELDRIVER respectively;

an output terminal of the continuous time linear equalizer CTLE is connected to an input terminal of the multi-rate clock data recovery module CDR, an input terminal of the signal bypass ByPass and an input terminal of the fiber channel mode rate decision FC_mode_Rate_decision respectively;

an output control signal of the fiber channel mode rate decision FC_mode_Rate_decision selects to output to one of a control port of the multi-rate clock data recovery module CDR and a control port of the signal bypass ByPass;

a data signal output terminal of the multi-rate clock data recovery module CDR is connected to an input terminal of the data selector MUX;

a data signal output terminal of the signal bypass ByPass is connected to another input terminal of the data selector MUX;

an output terminal of the data selector MUX is connected to an input terminal of the laser driver 28G VCSELDRIVER;

a clock output terminal of the multi-rate clock data recovery module CDR is connected to an input terminal of the monitoring clock module MONITOR CLOCK;

a positive and negative output terminals of the monitoring clock module MONITOR CLOCK are connected to chip pins MCLKP and MCLKN respectively;

two output pins of the laser driver 28G VCSELDRIVER are connected to chip pins OUTP and OUTN respectively;

an output current signal of the bias current module IBIAS is output through the chip pin IBIAS.

the transmitter TX first uses the optical modulation amplitude signal loss module OMALOS to complete a judgment of an optical modulation amplitude for an attenuated electrical signal transmitted through metal traces on a PCB board, when the signal is greater than the preset threshold, the module outputs an enable signal to control a linear equalizer CTLE and a laser driver 28G VCSELDRIVER to start, and the chip to drive a VCSEL laser to emit an optical signal to open a signal transmission path; otherwise, the entire signal transmission path is closed;

second, when the signal transmission path is open, the linear equalizer CTLE is arranged to complete a first stage optimization for high-frequency compensation of the attenuated electrical signal transmitted through the metal traces on the PCB board; and then, a second stage optimization of the signal is processed, specifically:

in response to the judgment of the first stage optimization, and according to the judgment decision result, select one of a multi-rate clock data recovery module CDR and a signal bypass ByPass as a selected signal path to start; when the multi-rate clock data recovery module CDR is started, a signal quality of the signal after the first stage optimization is further improved to complete the second stage optimization;

the signal after a two-stage optimization is sent to the laser driver 28G VCSELDRIVER to drive the VCSEL laser to emit an optical signal.

The transmitter chip located in the data center undertakes point-to-point massive data transmission, so it is necessary to ensure that the transmitted optical signal has a sufficiently low bit error rate and high signal quality to be capable of high-throughput data handling. The internal first level of the TX transmitter is very important; the connection between the input pins INP and INN of the transmitter and the chip pins of the upper level is transmitted through the metal traces on the PCB board, which will seriously degrade the signal quality during transmission. The most common phenomenon is that the edge of the signal does not go up or down, and the waveform is out of shape. Therefore, the first-level circuit module CTLE continuous time linear equalizer plays a role in optimizing the degraded signal, so that the signal after passing through the module has a faster rise and fall time, that is, the original real signal is partially recovered, and the signal loss is greatly reduced. OMALOS (Optical Modulation Amplitude, Loss Of Signal optical modulation amplitude) module is used to complete the optical modulation amplitude judgment of the electrical signal transmitted through the metal traces on the PCB board. When the signal is greater than the preset threshold, the module outputs an enable signal, the control module CTLE and the module 28G VCSEL DRIVER start, and then the signal can drive the VCSEL laser to emit optical signals through the chip pins OUTP and OUTN; otherwise, the entire transmission path is closed.

The partially recovered signal is passed on to the next stage to further improve the signal quality. The most important function of the CDR clock data recovery module is to reproduce a clock signal that is almost similar to the signal frequency, use this clock signal to cooperate with the trigger to re-sample the signal to be recovered and output a high-quality signal; whether to use high-speed CDR to optimize the signal needs to be judged in advance.

Preferred Embodiment 2: This embodiment includes further limitations of preferred embodiment 1.

The transmitter TX further comprises an eye diagram cross point adjustment module CPA, wherein an output terminal of the eye diagram cross point adjustment module CPA is connected to a control terminal of the laser driver 28G VCSELDRIVER, and the eye diagram cross point adjustment module CPA is arranged to balance a cross point in the signal to a center of the eye diagram and then provide an output.

The fiber channel mode rate decision module FC_mode_Rate_decision complete a judgment processing on the first stage optimization signal.

The specific method of selecting one of the multi-rate clock data recovery module CDR and the signal bypass ByPass as the selected signal path to start according to the judgment decision comprises:

a first type: in FC mode, the fiber channel mode rate decision module FC_mode_Rate_decision is activated, if a signal detected by the fiber channel mode rate decision module FC_mode_Rate_decision is 8G FC, the fiber channel mode rate decision module FC_mode_Rate_decision controls to activate the signal bypass ByPass as the selected signal path; if a signal detected by the fiber channel mode rate decision module FC_mode_Rate_decision is 16G/32G FC, the fiber channel mode rate decision module FC_mode_Rate_decision controls to activate the multi-rate clock data recovery module CDR as the selected signal path;

a second type: in non-FC mode, the signal bypass ByPass is the signal path with a signal rate is 1~28.1 Gbps; the multi-rate clock data recovery module CDR supports the signal path with a 19~28.1 Gbps signal rate or the signal path with a 19/2~28.1/2 Gbps signal rate, the signal path and a clock rate selection are configured by a digital register.

The locked clock of the CDR can be divided by $8/16$ through the MONITOR CLOCK module and then output to the outside of the chip as a trigger signal.

Through the two-stage optimization, after optimizing the signal to the greatest extent, the laser driver 28G VCSEL DRIVER in the last stage converts the electrical signal into a modulation current to drive the VCSEL laser outside the chip to emit light. In order to make the light quality sufficiently good, the switching rate of the modulation current must be fast enough, so two signal adjustment loops are used in the built-in output stage circuit of the laser driver to preprocess the signal, that is: Pre-de-emphasis pre_De_Emphasis and post-de-emphasis, the former is to process the rising of the signal and the latter is to pre-process the falling, so that the output eye diagram is symmetrical and has sufficient eye diagram margin. Further, CPA (crosspoint adjustment) is used to balance the cross point to the center of the eye diagram, and the processed signal is then used to drive the laser to emit light to obtain a better optical signal.

VCSEL lasers will age after working for a long time, and the increase in ambient temperature will eventually reduce the luminous efficiency of the laser. The monitoring photodiode MPD generates monitoring current in real time and sends it to the ADC inside the transmitter chip to judge the luminous efficiency of the laser. The external MCU reads the relevant value through $I^2C$, and then changes the size of the IBIAS bias current or modulates the size of the current.

Preferred Embodiment 3: This embodiment includes further limitations of preferred embodiment 1 or 2.

The digital control unit DIGITAL comprises an analog-to-digital converter ADC, a $I^2C$ slave, a control register digital core Register Control Digital Core and TX part control port, the TX part control port comprises the linear equalizer CTLE, the eye diagram cross point adjustment CPA, a loss of signal threshold setting LOS_TH, a clock data recovery loop bandwidth adjustment CDR_LBW, the eye diagram cross point adjustment CPA, the bias current IBIAS, an output swing adjustment OP_SWING and a de-emphasis degree adjustment De_Emphasis;
  an input terminal of I²C slave is connected to a chip pin SCL;
  an input and output ports of the I²C slave are connected to a chip pin SDA;
  the analog-to-digital converter ADC receives a temperature signal TEMP, a monitoring current MPD and a bias current IBIAS.

The configurable functions in the TX are:
linear equalizer CTLE (high-frequency compensation strength adjustment), eye diagram cross point adjustment CPA, signal loss threshold setting LOS_TH, Clock data recovery loop bandwidth adjustment CDR_LBW, eye cross point adjustment CPA, output swing adjustment OP_SWING, de-pre-emphasis adjustment De_Emphasis, bias current IBIAS.

The 12-bit high-precision ADC will convert some key information inside the chip, such as: MPD monitored the current size, the IBIAS current value, the working power supply voltage VCC, the internal ambient temperature TEMP. The analog quantity is converted into digital quantity and stored in the digital register, and read out from I²C to the outside of the chip for the host to monitor whether the working status of the chip is safe.

Preferred Embodiment 4: This embodiment includes further limitations of preferred embodiment 1, 2 or 3.

The power module POWER comprises a DC power supply VDC, a DC chopper DC/DC, resistors R33 and R34;
  the DC power supply VDC provides working power for the bias current module IBIAS and a chip input and output port I/O, at the same time, the DC chopper DC/DC converts the DC power supply VDC into a DC power VCC1.8V and outputs through a pin VOUT, the DC power VCC1.8V provides working power for a laser driver LDD and the digital control unit DIGITAL respectively;
  an output terminal VOUT of the DC chopper DC/DC is simultaneously connected to one end of the resistor R33 and a chip pin CAP; the chip pin CAP is grounded through a capacitor C11;
  another end of the resistor R33 is simultaneously connected to one end of the resistor R44 and a feedback signal terminal FB of the DC chopper DC/DC;
  another end of the resistor R44 is connected to ground;
  a switch input port SW of the DC chopper DC/DC is connected to a chip pin SW; the chip pin SW is connected to a positive electrode of the DC power supply VDC through an inductor L11;
  a power supply voltage port VCC of the DC chopper DC/DC is connected to a chip pin VCC; the chip pin VCC is connected to the positive electrode of the DC power supply VDC;
  an enable port EN of the DC chopper DC/DC is connected to a chip pin EN; the chip pin EN is simultaneously connected to one end of a capacitor C22 and the positive electrode of the DC power supply VDC; another end of the capacitor C22 is grounded, and a negative electrode of the DC power supply VDC is grounded.

The power management part has a built-in DC/DC module.

Since the application scenario of this chip is a data center, the data center is very sensitive to the power consumption and size of the product, so it is necessary to reduce the power consumption and area of the transmitter chip as much as possible.

The first solution of traditional transmitter chip power supply is to provide the transmitter chip with a power supply voltage of 3.3V, and then reduce the 3.3V power supply voltage to 1.8V through the LDO inside the chip. The efficiency of the LDO as a power supply is usually low. The overall power consumption of this solution chip is 320 mW. The present invention uses DC/DC with higher power supply efficiency to replace LDO with low power supply efficiency. The power supply voltage generated by DC/DC is supplied to LDD (laser driver), DG part (digital control unit Digital). The power supply voltage of the IBIAS and I/O part is supplied after the 3.3V power supply voltage is passed through other step-down methods. The overall power consumption of this embodiment is 220 mW, saving 100 mW power consumption.

In the second solution of traditional transmitter chip power supply externally equipped with a DC/DC chip, the initial 3.3V of the power supply voltage is reduced to 1.8V and supply to the transmitter chip, the DC/DC chip of this solution needs to be purchased separately, the price is high and the PCB board area is occupied, and the noise on the PCB board will be strung into the chip along with the metal wires, which greatly affects the quality of the transmitted signal, and is not conducive to the cost reduction and miniaturization of optical modules in the data center; also, the generalized DC/DC cannot meet the increasingly digital design requirements of transmitter chips. When compared to the second solution, the present invention designs a DC/DC built into the transmitter chip according to the power consumption requirements of the transmitter chip. This customized DC/DC has the characteristics of small area and strong performance, and the cost and power consumption of the whole module are reduced.

The DC/DC is further optimized in terms of area. For example, the generation of the reference voltage can be uniformly provided by the bandgap reference voltage module in the chip, and the sawtooth wave oscillator can also be synthesized by the same oscillator in the chip. The size of the switch tube SW, which occupies the largest chip layout area, can be reasonably designed according to the overall demand power consumption of the chip. After area optimization in various aspects, the area of the DC/DC module is only 0.7 mm², while the occupied area of a single DC/DC is 4 mm². The resistance of resistors R33 and R44 can be adjusted to change the output voltage (as long as the transmitter chip can still guarantee the performance under low voltage conditions, the 1.8V power supply voltage can also be lowered to further reduce the overall power consumption). The DC/DC module can also be designed as multiple voltage output ports to meet the needs of different power domains on-chip. The ways to adjust the output voltage include laser trimming and fuse trimming, one-time programmable (OTP) and register programming, etc.

During the power onset process, the chip first resets through the POR (poweronreset) module and then starts all functional modules.

Figure 2:
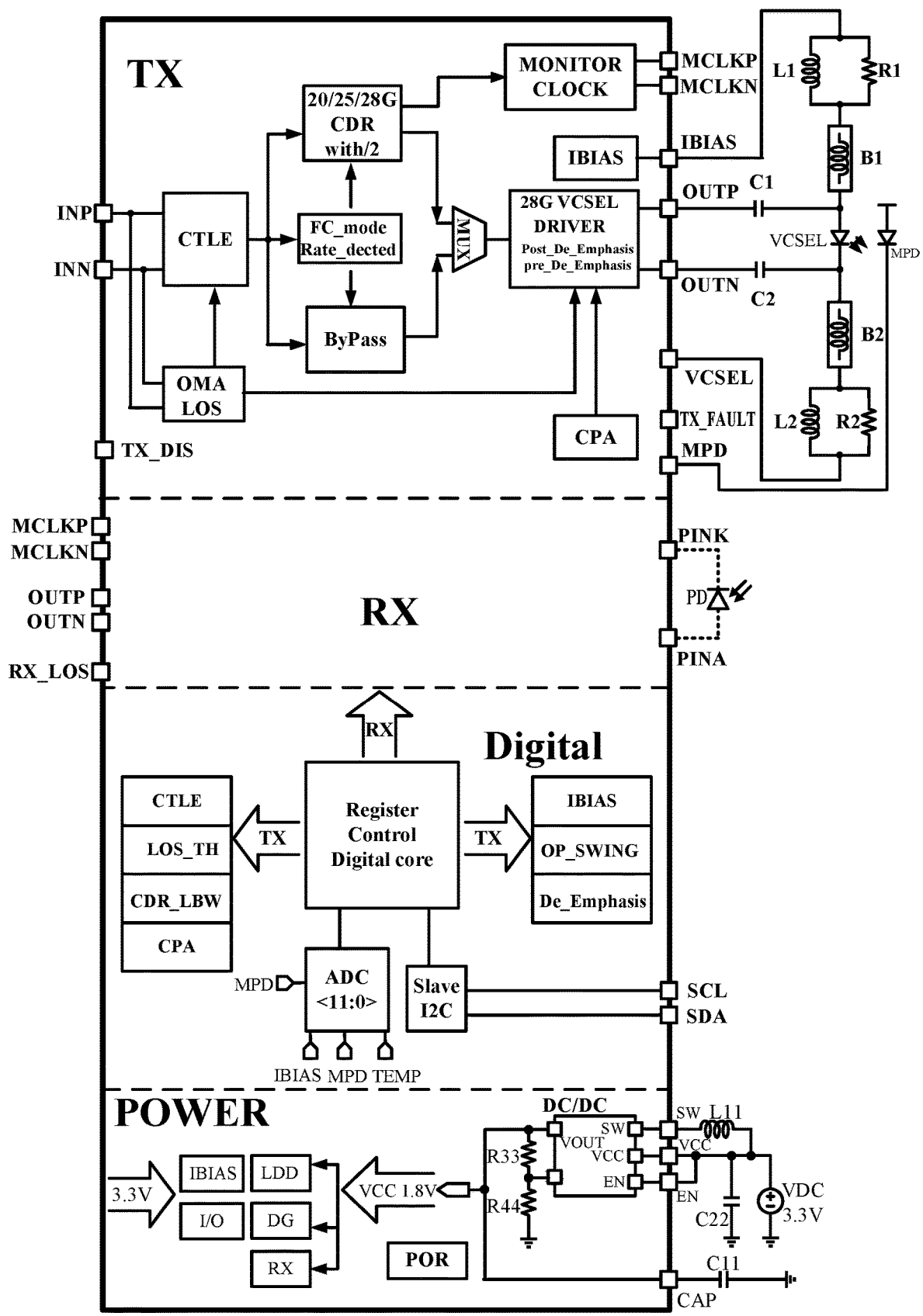
FIG. 2 is a schematic diagram of an integrated transceiver chip constructed by using the optical transmitter chip based on OTN transmission technology of the present invention.

Preferred Embodiment 5: This embodiment is shown in FIG. 2. This embodiment adopts the optical transmitter chip based on OTN transmission technology as described in the Preferred Embodiments 1 to 4 to construct a transceiver integrated chip.

The optical transceiver integrated chip based on OTN transmission technology comprises a receiver RX, a transmitter TX, a digital control unit Digital and a power module POWER.

The digital control unit Digital is used to provide control signals to the receiver RX and the transmitter TX.

The power module POWER is used to provide working power for the chip.

The transmitter TX adopts the optical transmitter chip based on the OTN transmission technology as described in the Preferred Embodiments 1 to 4, and the receiver RX adopts the existing technology to realize.

The digital control unit Digital and the power module POWER used for the transceiver integrated chip may appropriately increase the internal functional modules for the RX chip.

Although the present invention is described herein with reference to specific embodiments, it should be understood that these embodiments are merely illustrative of the principles and applications of the present invention. It is therefore to be understood that numerous modifications may be made to the exemplary embodiments and that other arrangements may be devised without departing from the spirit and scope of the present invention as defined by the appended claims. It shall be understood that different dependent claims and features described herein may be combined in a different way than that described in the original claims. It should also be appreciated that features described in connection with individual embodiments can be used in other described embodiments.

What is claimed is:

1. An optical transmitter chip based on OTN transmission technology, characterized in that, comprising: a transmitter TX, a digital control unit DIGITAL, and a power module POWER;

the digital control unit DIGITAL communicates with a host and provides a control signal to the transmitter TX;

the power module POWER is arranged to provide working power to the chip;

the transmitter TX first utilizes an optical modulation amplitude signal loss module OMALOS to complete a judgment of an optical modulation amplitude for an attenuated electrical signal transmitted through metal traces on a PCB board, wherein if the signal has a value greater than a preset threshold, the module outputs an enable signal to control a linear equalizer CTLE and a laser driver 28G VCSELDRIVER to start, and activate the chip to drive a VCSEL laser to emit an optical signal to open a signal transmission path; otherwise, the entire signal transmission path is closed;

then, under a condition that the signal transmission path is open, the linear equalizer CTLE is utilized to complete a first stage optimization for high-frequency compensation of the attenuated electrical signal transmitted through the metal traces on the PCB board;

specifically, one of the multi-rate clock data recovery module CDR and the signal bypass ByPass is selected as the selected signal path to start according to a judgment decision by:

a first type: in FC mode, a fiber channel mode rate decision module FC_mode_Rate_decision is activated, if a signal detected by the fiber channel mode rate decision module FC_mode_Rate_decision is 8G FC, the fiber channel mode rate decision module FC_mode_Rate_decision controls to activate the signal bypass ByPass as the selected signal path; if a signal detected by the fiber channel mode rate decision module FC_mode_Rate_decision is 16G/32G FC, the fiber channel mode rate decision module FC_mode_Rate_decision controls to activate the multi-rate clock data recovery module CDR as the selected signal path;

a second type: in non-FC mode, the signal bypass ByPass is the signal path with a signal rate is 1~28.1 Gbps; the multi-rate clock data recovery module CDR supports the signal path with a 19~28.1 Gbps signal rate or the signal path with a 19/2~28.1/2 Gbps signal rate, the signal path and a clock rate selection are configured by a digital register;

and then, a second stage optimization of the signal is processed, specifically: process judgment of the signal after the first stage optimization, and according to the judgment decision, select one of a multi-rate clock data recovery module CDR and a signal bypass ByPass as a selected signal path to start;

if the multi-rate clock data recovery module CDR is started, a signal quality of the signal after the first stage optimization is further improved to complete the second stage optimization;

the signal after a two-stage optimization is sent to the laser driver 28G VCSELDRIVER to drive the VCSEL laser to emit an optical signal.

2. The optical transmitter chip based on OTN transmission technology according to claim 1, characterized in that: the transmitter TX comprises the linear equalizer CTLE, the optical modulation amplitude signal loss module OMALOS, the multi-rate clock data recovery module CDR, the signal bypass ByPass, a fiber channel mode rate decision FC_mode_Rate_decision, a data selector MUX, a monitor clock module MONITOR CLOCK, the laser driver 28G VCSELDRIVER and a bias current module IBIAS;

chip pins INP and INN are simultaneously connected to two input terminals of the continuous time linear equalizer CTLE and two input terminals of the optical modulation amplitude signal loss module OMALOS;

a control signal output terminal of the optical modulation amplitude signal loss module OMALOS is connected to a control terminal of the continuous time linear equalizer CTLE and a control terminal of the laser driver 28G VCSELDRIVER respectively;

an output terminal of the continuous time linear equalizer CTLE is connected to an input terminal of the multi-rate clock data recovery module CDR, an input terminal of the signal bypass ByPass and an input terminal of the fiber channel mode rate decision FC_mode_Rate_decision respectively;

an output control signal of the fiber channel mode rate decision FC_mode_Rate_decision selects to output to one of a control port of the multi-rate clock data recovery module CDR and a control port of the signal bypass ByPass;

a data signal output terminal of the multi-rate clock data recovery module CDR is connected to an input terminal of the data selector MUX;

a data signal output terminal of the signal bypass ByPass is connected to another input terminal of the data selector MUX;

an output terminal of the data selector MUX is connected to an input terminal of the laser driver 28G VCSELDRIVER;

a clock output terminal of the multi-rate clock data recovery module CDR is connected to an input terminal of the monitoring clock module MONITOR CLOCK;

a positive and negative output terminals of the monitoring clock module MONITOR CLOCK are connected to chip pins MCLKP and MCLKN respectively;

two output pins of the laser driver 28G VCSELDRIVER are connected to chip pins OUTP and OUTN respectively;

an output current signal of the bias current module IBIAS is output through the chip pin IBIAS.

3. The optical transmitter chip based on OTN transmission technology according to claim 2, characterized in that: the transmitter TX further comprises an eye diagram cross point adjustment module CPA, wherein an output terminal of the eye diagram cross point adjustment module CPA is connected to a control terminal of the laser driver 28G VCSELDRIVER, and the eye diagram cross point adjustment module CPA is arranged to balance a cross point in the signal to a center of the eye diagram and then provide an output.

4. The optical transmitter chip based on OTN transmission technology according to claim 1, characterized in that: the digital control unit DIGITAL comprises an analog-to-digital converter ADC, a I²C slave, a control register digital core Register Control Digital Core and TX part control port, the TX part control port comprises the linear equalizer CTLE, the eye diagram cross point adjustment CPA, a loss of signal threshold setting LOS_TH, a clock data recovery loop bandwidth adjustment CDR_LBW, the bias current IBIAS, an output swing adjustment OP_SWING and a de-emphasis degree adjustment De_Emphasis;
- an input terminal of I²C slave is connected to a chip pin SCL;
- an input and output ports of the I²C slave are connected to a chip pin SDA;
- the analog-to-digital converter ADC receives a temperature signal TEMP, a monitoring current MPD and a bias current IBIAS.

5. The optical transmitter chip based on OTN transmission technology according to claim 1, characterized in that: the power module POWER comprises a DC power supply VDC, a DC chopper DC/DC, resistors R33 and R34;
- the DC power supply VDC provides working power for the bias current module IBIAS and a chip input and output port I/O, at the same time, the DC chopper DC/DC converts the DC power supply VDC into a DC power VCC1.8V and outputs through a pin VOUT, the DC power VCC1.8V provides working power for a laser driver LDD and the digital control unit DIGITAL respectively;
- an output terminal VOUT of the DC chopper DC/DC is simultaneously connected to one end of the resistor R33 and a chip pin CAP; the chip pin CAP is grounded through a capacitor C11; another end of the resistor R33 is simultaneously connected to one end of the resistor R44 and a feedback signal terminal FB of the DC chopper DC/DC;
- another end of the resistor R44 is connected to ground;
- a switch input port SW of the DC chopper DC/DC is connected to a chip pin SW; the chip pin SW is connected to a positive electrode of the DC power supply VDC through an inductor L11; a power supply voltage port VCC of the DC chopper DC/DC is connected to a chip pin VCC; the chip pin VCC is connected to the positive electrode of the DC power supply VDC;
- an enable port EN of the DC chopper DC/DC is connected to a chip pin EN; the chip pin EN is simultaneously connected to one end of a capacitor C22 and the positive electrode of the DC power supply VDC; another end of the capacitor C22 is grounded, and a negative electrode of the DC power supply VDC is grounded.

* * * * *